United States Patent
Rydén et al.

(10) Patent No.: US 10,727,970 B2
(45) Date of Patent: Jul. 28, 2020

(54) METHODS AND USER EQUIPMENT, RADIO TRANSMITTER AND NETWORK NODE FOR MANAGING POSITIONING REFERENCE SIGNALS

(71) Applicant: Telefonaktiebolaget LM Ericsson (publ), Stockholm (SE)

(72) Inventors: Henrik Rydén, Linköping (SE); Fredrik Gunnarsson, Linköping (SE); Sara Modarres Razavi, Linköping (SE); Meng Wang, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/539,913

(22) PCT Filed: May 11, 2017

(86) PCT No.: PCT/EP2017/061333
§ 371 (c)(1),
(2) Date: Jun. 26, 2017

(87) PCT Pub. No.: WO2017/194675
PCT Pub. Date: Nov. 16, 2017

(65) Prior Publication Data
US 2018/0205482 A1    Jul. 19, 2018

Related U.S. Application Data

(60) Provisional application No. 62/335,738, filed on May 13, 2016.

(51) Int. Cl.
*H04W 24/00*    (2009.01)
*H04J 11/00*    (2006.01)
(Continued)

(52) U.S. Cl.
CPC .......... *H04J 11/0079* (2013.01); *G01S 1/04* (2013.01); *G01S 1/042* (2013.01); *G01S 5/0036* (2013.01);
(Continued)

(58) Field of Classification Search
CPC ..... H04J 11/0079; H04W 8/24; H04W 64/00; H04W 84/045; H04W 88/085; G01S 1/04; G01S 1/042; G01S 5/0036; G01S 5/0236
(Continued)

(56) References Cited

U.S. PATENT DOCUMENTS 5,583,513 A * 12/1996 Cohen ............... G01S 19/04
                                              342/353
8,174,439 B2 * 5/2012 Torimoto ........... G01C 21/206
                                              342/357.48
(Continued)

FOREIGN PATENT DOCUMENTS

CN    104602273 A        5/2015
CN    104602273 A *      5/2015  ........... G01S 5/0252
(Continued)

OTHER PUBLICATIONS

3GPP TS 36.455 v12.2.0; Technical Specification; 3rd Generation Partnership Project; Technical Specification Group Radio Access Network; Evolved Universal Terrestrial Radio Access (E-UTRA); LTE Positioning Protocol A (LPPa) (Release 12)—Mar. 2015.
(Continued)

*Primary Examiner* — Mahendra R Patel
(74) *Attorney, Agent, or Firm* — Baker Botts, LLP

(57) ABSTRACT

A method and a user equipment (110) as well as a method and a radio transmitter (120) for managing positioning reference signals are disclosed. Moreover, a method and a network node (130) for configuring positioning reference
(Continued)

signals are disclosed. The network node (130) sends (A050), to the user equipment (110), a reception configuration of positioning reference signals, wherein the reception configuration comprises a cell identity relating to the radio transmitter (120) and an identifier for determining of positioning reference signals. The network node (130) sends (A070), to the radio transmitter (120), a transmit configuration of positioning reference signals, wherein the transmit configuration comprises the cell identity and the identifier. The radio transmitter (120) determines (A090) the positioning reference signals based on the cell identity and the identifier. The radio transmitter (120) sends (A100) the positioning reference signals to the user equipment (110). The user equipment (110) estimates (A120), based on the positioning reference signals, signal characteristics relating to a position of the user equipment (110). The user equipment (110) sends (A130), to the network node (130), a report about the estimated signal characteristics. Corresponding computer programs and carriers therefor are also disclosed.

10 Claims, 10 Drawing Sheets

(51) Int. Cl.
| | |
|---|---|
| *H04W 8/24* | (2009.01) |
| *G01S 5/10* | (2006.01) |
| *G01S 1/04* | (2006.01) |
| *G01S 5/02* | (2010.01) |
| *H04W 64/00* | (2009.01) |
| *G01S 5/00* | (2006.01) |
| *H04W 88/08* | (2009.01) |
| *H04W 84/04* | (2009.01) |

(52) U.S. Cl.
CPC .......... *G01S 5/0226* (2013.01); *G01S 5/0236* (2013.01); *G01S 5/10* (2013.01); *H04W 8/24* (2013.01); *H04W 64/00* (2013.01); *H04W 84/045* (2013.01); *H04W 88/085* (2013.01)

(58) Field of Classification Search
USPC .............. 455/456.5, 441, 424; 1/1; 370/329
See application file for complete search history.

(56) References Cited

U.S. PATENT DOCUMENTS

| 8,478,190 | B2* | 7/2013 | Sayana ............. H04B 7/024 455/7 |
| 9,253,677 | B2* | 2/2016 | Siomina ............. H04W 64/00 |
| 9,445,390 | B2* | 9/2016 | Zhao ................. H04W 64/00 |
| 9,482,742 | B1* | 11/2016 | Fischer ............... H04B 7/024 |
| 9,651,653 | B2* | 5/2017 | Fischer ................ G01S 1/20 |
| 2005/0001742 | A1* | 1/2005 | Small .................. G01S 1/24 340/988 |
| 2007/0021122 | A1* | 1/2007 | Lane ................... H04B 7/01 455/441 |
| 2008/0129591 | A1* | 6/2008 | Lamance ............ G01S 19/11 342/357.42 |
| 2009/0129291 | A1* | 5/2009 | Gupta ................ H04W 8/26 370/254 |
| 2010/0189038 | A1* | 7/2010 | Chen ................. H04L 1/0001 370/328 |
| 2010/0234016 | A1* | 9/2010 | Palanki ............. H04W 48/08 455/424 |
| 2010/0260154 | A1* | 10/2010 | Frank ................. G01S 5/10 370/336 |
| 2010/0317343 | A1* | 12/2010 | Krishnamurthy ...... G01S 1/30 455/435.1 |
| 2010/0317351 | A1* | 12/2010 | Gerstenberger ...... H04W 8/26 455/443 |
| 2011/0124347 | A1* | 5/2011 | Chen ................ H04W 64/00 455/456.1 |
| 2011/0149903 | A1* | 6/2011 | Krishnamurthy ..... H04L 5/0007 370/330 |
| 2011/0159901 | A1* | 6/2011 | Frenger .............. H04L 5/0082 455/502 |
| 2011/0244891 | A1* | 10/2011 | Ghinamo ............ G01S 19/40 455/456.6 |
| 2012/0040691 | A1* | 2/2012 | Han .................. G01S 1/042 455/456.1 |
| 2012/0231809 | A1* | 9/2012 | Siomina .............. H04W 64/00 455/456.1 |
| 2013/0315168 | A1* | 11/2013 | Frank ................ G01S 5/10 370/329 |
| 2014/0073356 | A1* | 3/2014 | Siomina .............. H04W 4/029 455/456.2 |
| 2014/0176366 | A1* | 6/2014 | Fischer ............. H04W 64/006 342/374 |
| 2015/0119066 | A1* | 4/2015 | Chiou ............. H04L 29/08657 455/456.1 |
| 2015/0365790 | A1* | 12/2015 | Edge ................ G01S 1/20 455/404.2 |

FOREIGN PATENT DOCUMENTS

| CN | 104838705 A | * | 8/2015 | ........... H04L 5/0048 |
| CN | 107660343 A | * | 2/2018 | .......... H04W 72/046 |
| CN | 107690787 A | * | 2/2018 | ......... H04L 27/2602 |
| CN | 108541393 A | * | 9/2018 | ............ H04W 64/00 |
| EP | 3110214 A4 | * | 3/2017 | ............ H04W 64/00 |
| EP | 3120491 A4 | * | 11/2017 | ........... H04L 5/0073 |
| EP | 3306992 A1 | * | 4/2018 | ........... G01S 5/0036 |
| EP | 3165938 A4 | * | 6/2018 | ............. G01S 1/042 |
| EP | 3251235 A4 | * | 9/2018 | ............... G01S 3/48 |
| JP | 2012529842 A | | 11/2012 | |
| JP | 2016509771 A | | 3/2016 | |
| RU | 2012151482 A | | 6/2014 | |
| WO | WO-9422032 A1 | * | 9/1994 | ............. G01S 19/11 |
| WO | WO-2011139201 A1 | * | 11/2011 | ............ H04W 64/00 |
| WO | WO-2013147679 A3 | * | 3/2014 | .......... H04W 72/048 |
| WO | WO-2014058363 A1 | * | 4/2014 | .......... H04W 64/003 |
| WO | WO-2014105324 A1 | * | 7/2014 | ............... G01S 1/20 |
| WO | WO-2015112430 A1 | * | 7/2015 | ........... G01S 5/0215 |
| WO | WO-2015178830 A1 | * | 11/2015 | ............ H04W 64/00 |
| WO | 2015/192113 A1 | | 12/2015 | |
| WO | WO-2015192113 A1 | * | 12/2015 | ............ H04W 4/029 |
| WO | WO2015196376 | | 12/2015 | |
| WO | WO-2016032293 A3 | * | 4/2016 | ............... G01S 5/06 |
| WO | WO-2016182821 A1 | * | 11/2016 | ............... G01S 1/20 |

OTHER PUBLICATIONS

3GPP TSG RAN WG1 meeting #84bis; Busan, Korea; Source: Huawei, HiSilicon; Title: Discussion on the same PCI case for OTDOA enhancements (R1-162606)—Apr. 11-15, 2016.
3GPP TSG-RAN WG1 Meeting #84bis; Busan, Korea; Change Request; Title: Introduction of OTDOA enhancements for the shared Cell-ID scenario; Source to WG: Qualcomm Incorporated; Source to TSG: R1 (R1-163057)—Apr. 11-15, 2016.
International Search Report and Written Opinion of the International Searching Authority, International Application No. PCT/EP2017/061333, dated Sep. 18, 2017, 12 pages.
Observed Time Difference of Arrival (OTDOA) Positioning in 3GPP LTE, Sven Fischer, Qualcomm Technologies, Inc., dated Jun. 6, 2014, 62 pages.
Russian Search Report dated Jan. 13, 2019, Application No. PCT/EP2017/061333.
JP Office Action received for Patent Application No. JP2018-555749 dated Jan. 31, 2020.
CN Office Action received for Patent Application No. CN201780029178.0 dated Mar. 16, 2020.

* cited by examiner

METHODS AND USER EQUIPMENT, RADIO TRANSMITTER AND NETWORK NODE FOR MANAGING POSITIONING REFERENCE SIGNALS

PRIORITY

This nonprovisional application is a U.S. National Stage Filing under 35 U.S.C. § 371 of International Patent Application Serial No. PCT/EP2017/061333 filed May 11, 2017, and entitled "Methods And User Equipment, Radio Transmitter And Network Node For Managing Positioning Reference Signals" which claims priority to U.S. Provisional Patent Application No. 62/335,738 filed May 13, 2016, both of which are hereby incorporated by reference in their entirety.

TECHNICAL FIELD

Embodiments herein relate to wireless communication systems, such as cellular networks. In particular, a method and a user equipment as well as a method and a radio transmitter for managing positioning reference signals are disclosed. Moreover, a method and a network node for configuring positioning reference signals are disclosed. Corresponding computer programs and carriers therefor are also disclosed.

BACKGROUND

Location-based services and emergency call positioning drive the development of positioning in wireless networks. Positioning support in Third Generation Partnership Project Long Term Evolution (3GPP LTE) was introduced in Release 9. This enables operators to retrieve position information for location-based services and to meet regulatory emergency call positioning requirements.

Positioning in LTE is supported by direct interactions between a user equipment (UE) and a location server, such as an Enhance Serving Mobile Location Center (E-SMLC), is via the LTE Positioning Protocol (LPP). Moreover, there are also interactions between the location server and an eNodeB, e.g. a radio base station, via the LPPa protocol, to some extent supported by interactions between the eNodeB and the UE via the Radio Resource Control (RRC) protocol.

The following positioning techniques are considered in LTE:
  Enhanced Cell identity (ID). Essentially cell ID information to associate the UE to the serving area of a serving cell, and then additional information to determine a finer granularity position.
  Assisted Global Navigation Satellite Systems (Assisted GNSS). GNSS information retrieved by the UE, supported by assistance information provided to the UE from E-SMLC
  Observed Time Difference of Arrival (OTDOA). The UE estimates the time difference of reference signals from different base stations and sends to the E-SMLC for multi-lateration.
  Uplink Time Difference Of Arrival (UTDOA). The UE is requested to transmit a specific waveform that is detected by multiple location measurement units, e.g. an eNB, at known positions. These measurements are forwarded to E-SMLC for multi-lateration.

Global positioning system (GPS)-enabled terminals can meet the requirement for positioning, but it cannot provide the required availability due to the satellite signals being blocked in urban and indoor environments. Therefore other techniques are needed in such environments. OTDOA has been introduced in 3GPP release 9 as a downlink (DL) positioning method. As illustrated in FIG. 1, OTDOA in LTE is based on the UE measuring the Time Of Arrival (TOA) of signals received from eNBs. The UE measures the relative difference between the reference cell and another specific cell, defined as Reference Signal Time Difference (RSTD) measurement. Every such RSTD determines a hyperbola and the interested point of these hyperbolas can be considered as the UE position. Here, the reference cell is selected by the UE and the RSTD measurement can be performed on an intra-frequency cell, i.e. reference cell/neighbor cell are on the same carrier frequency as the serving cell, or inter-frequency cell, i.e. at least one of reference cell/neighbor cell is on the different carrier frequency from the serving cell.

PRS and Configuration Thereof

In principle, it is possible to measure RSTD on any downlink signals e.g. Cell-specific Reference Signals (CRS). However as in OTDOA the UE requires to detect multiple neighbor-cell signals, these signals suffer from poor hearability. Hence, Positioning Reference Signals (PRSs) have been introduced to improve OTDOA positioning performance. FIGS. 2a and 2b and FIGS. 3a and 3b show the arrangement of the PRS assigned resources for one resource block using normal Cyclic Prefix (CP) and extended CP, respectively. In such PRS subframe, in order to reduce the interference with neighbor cells, no Physical Downlink Shard Channel (PDSCH) data is carried. Physical Downlink Control Channel (PDCCH) and CRSs are retained in the subframe, while PRSs are distributed in a "diagonal" way in between CRSs. Similar to CRS, cell-specific frequency shift i.e. the number of frequency shift v_shift is given by Physical Cell Identity (PCI) modulo 6, is applied to PRS pattern, which helps avoid time-frequency PRS collision up to six neighbor cells.

In an LTE system, consecutive PRS subframes a.k.a. positioning occasions are transmitted periodically in the downlink. One positioning occasion may contain up to six consecutive PRS subframes. The period of one positioning occasion can be configured to every $T_{PRS}$=160, 320, 640 and 1280 milliseconds. It is noted that, in Time Division Duplex (TDD) mode, uplink subframe and other special frames cannot contain PRSs. Another parameter to characterize the PRS transmission schedule is the cell specific subframe offset, which defines the starting subframe of PRS transmission relative to SFN=0. As shown in Table 1, the PRS periodicity $T_{PRS}$ and subframe offset $\Delta_{PRS}$ are derived from the PRS Configuration Index $I_{PRS}$.

TABLE 1

Positioning reference signal subframe configuration

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-4095 |  | Reserved |

PRS Muting

In some cases, in particular in dense deployments, only cell-specific frequency shift may not be sufficient to avoid interference from neighbor cells. Therefore, PRS muting has been introduced to further reduce inter-cell interference by muting PRS transmission in other cells based on a periodical "muting pattern". The PRS muting configuration of a cell is defined by a periodic muting sequence with a periodicity of $T_{REP}$, where $T_{REP}$ counted in number of PRS positioning occasions can be 2, 4, 8, or 16. Correspondingly, the PRS configuration is represented by a bit string of length 2, 4, 8, or 16.

Sequence Generation

The PRS sequence that is transmitted on antenna port 6 in the resources illustrated in FIGS. 2a-2b, 3a-3b for one frequency shift is generated by the reference-signal sequence $r_{l,n_s}(m)$ defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

where $n_s$ is the slot number within a radio frame, l is the OFDM symbol number within the slot.

The sequence c(n) is defined by $$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

where $N_C = 1600$ and the first m-sequence shall be initialized with $x_1(0)=$, $x_1(n)=0$, $n=1, 2, \ldots, 30$. The initialization of the second m-sequence is denoted by $c_{init} = \Sigma_{i=0}^{30} x_2(i) \cdot 2^i$ were the pseudo-random sequence generator shall be initialized with $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP} \quad (1)$$

$$N_{CP} = \begin{cases} 1 & \text{for normal } CP \\ 0 & \text{for extended } CP \end{cases}.$$

Transmission Points for Macro Cell Coverage Extension

An intention of distributed low-power transmission points (TP), also known as Remote Radio Heads (RRH) within a macro cell is to improve the macro cell coverage. This means that portions of the macro cell's coverage area is covered by smaller coverage areas of the TPs as illustrated in FIG. 4. The TPs are connected to an eNB via fiber and the non-collocated TPs may have the identical PCI as the associated macro cell. The PRS is generated based on the PCI of the macro cell, and identical PRS sequences would be transmitted by multiple TPs.

Cell Portion

The concept of cell portion has been introduced in Release 12 of specification for LTE. Cell Portion is a geographical part of a cell. A cell portion is semi-static, and identical for both the uplink (UL) and the downlink (DL). Within a cell, a cell portion is uniquely identified by its Cell Portion ID. This "Cell Portion ID" parameter gives the current Cell Portion associated with the target UE. The Cell Portion ID is the unique identifier for a cell portion within a cell.

When the UE reported RSTD measurements cannot be uniquely associated with a particular TP/cell, then the location server does not know the actual location coordinates of the corresponding TP/cell for the PRS measured by the UE. This problem is known as PCI ambiguity issue, and can cause a large error in the reported RSTD and thus the positioning accuracy can degrade significantly. There is couple of situations where this issue becomes problematic:

1) While several TPs send the same PRS sequence as their associated macro cell. One solution in such deployment scenarios is to not transmit from the associated TPs but only transmit PRS from the macro cell only. However, this would reduce the number of possible UE measurements for positioning, since the TPs would not be exploited.
2) The number of physical cell IDs is limited and hence in dense cellular networks, in case where a proper muting procedure is activated, then there is a possibility that the UE hears cells with the same PCI. As two cells with the same PCI will generate the same PRS sequence according to (1), this would be another scenario for PCI ambiguity issue.

SUMMARY

An object may be to enable improvement of and/or to improve accuracy of RSTD reports in the above mentioned scenarios.

According to an aspect, the object is achieved by a method, performed by a user equipment, for managing positioning reference signals. The user equipment receives, from a network node, a reception configuration of the positioning reference signals relating to a radio transmitter. The reception configuration comprises a cell identity relating to the radio transmitter and an identifier for determining of the positioning reference signals. Moreover, the user equipment receives, according to the reception configuration, the positioning reference signals from the radio transmitter. The user equipment also estimates, based on the positioning reference signals, signal characteristics relating to a position of the user equipment. Furthermore, the user equipment sends, to the network node, a report about the estimated signal characteristics.

According to another aspect, the object is achieved by a user equipment configured for managing positioning reference signals. The user equipment is configured for receiving, from a network node, a reception configuration of the positioning reference signals relating to a radio transmitter. The reception configuration comprises a cell identity relating to the radio transmitter and an identifier for determining of the positioning reference signals. Moreover, the user equipment is configured for receiving, according to the reception configuration, the positioning reference signals from the radio transmitter. The user equipment is further configured for estimating, based on the positioning reference signals, signal characteristics relating to a position of the user equipment. Furthermore, the user equipment is configured for sending, to the network node, a report about the estimated signal characteristics.

According to a further aspect, the object is achieved by a method, performed by a radio transmitter, for managing positioning reference signals. The radio transmitter receives, from a network node, a transmit configuration of the positioning reference signals. The transmit configuration comprises a cell identity relating to the radio transmitter and an identifier for determining of positioning reference signals. Next, the radio transmitter determines the positioning reference signals based on the cell identity and the identifier. Furthermore, the radio transmitter sends the positioning reference signals.

According to yet another aspect, the object is achieved by a radio transmitter configured for managing positioning reference signals. The radio transmitter is configured for receiving, from a network node, a transmit configuration of the positioning reference signals. The transmit configuration comprises a cell identity relating to the radio transmitter and an identifier for determining of positioning reference signals. Moreover, the radio transmitter is configured for determining the positioning reference signals based on the cell identity and the identifier. Furthermore, the radio transmitter is configured for sending the positioning reference signals.

According to a still other aspect, the object is achieved by a method, performed by a network node, for configuring positioning reference signals. The network node sends, to a user equipment, a reception configuration of positioning reference signals. The reception configuration comprises a cell identity relating to the radio transmitter and an identifier for determining of positioning reference signals. Moreover, the network node sends, to a radio transmitter, a transmit configuration of positioning reference signals. The transmit configuration comprises the cell identity and the identifier.

According to a still further aspect, the object is achieved by a network node configured for configuring positioning reference signals. The network node is configured for sending, to a user equipment, a reception configuration of positioning reference signals. The reception configuration comprises a cell identity relating to the radio transmitter and an identifier for determining of positioning reference signals. Moreover, the network node is configured for sending, to a radio transmitter, a transmit configuration of positioning reference signals. The transmit configuration comprises the cell identity and the identifier.

According to further aspects, the object is achieved by computer programs and carriers therefor corresponding to the aspects above.

In some embodiments relating to the user equipment and the radio transmitter, determination of positioning reference signals is performed by an initialization of $c_{init}$ that reduces the PCI ambiguity problem by generating orthogonal PRS sequences for cells with same PCI. With some embodiments, the LPP/LPPa protocol is extended by introducing an identifier, such as a 3-bit Additional Sequence Identifier (ASID) element, which also may be used to distinguish TPs in a non-collocated TP deployment scenario. In another embodiment, the LPP/LPPa protocol is extended with a 12-bit ASID element.

A benefit, according to some embodiments, of mitigating the PCI ambiguity and enabling TP specific PRS patterns is achieved by the initialization of $c_{init}$ and an extension to the LPP/LPPa protocol.

Advantageously, the embodiments herein increase the positioning accuracy thanks to that PCI ambiguity is mitigated by means of generation of orthogonal PRS sequences for cells with same PCI by use of at least the aforementioned identifier, i.e. the identifier for determining of positioning reference signals.

Moreover, at least some embodiments enable the possibility to report RSTD measurements for cells with same PCI, where cells are distinguished by at least the identifier.

Furthermore, at least some embodiments provide support for TP-specific PRS.

Aside from the advantage of mitigating the PCI ambiguity, and hence increasing the position estimation accuracy, some embodiments introduce the initialization of $c_{init}$ and extend LPP/LPPa with the identifier, such as an ASID information element.

Another advantage is that due to having greater number of PRS sequences, in case of addition of new cells (or small cells) in the network, the PRS sequence planning for the new cell becomes practically simpler as there are more options available.

Moreover, the existing planning based on PCI can be reused, and the additional configurations enabled by the identifier adds to the existing planning, by enabling a more fine granular configuration within the existing PCI plan.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
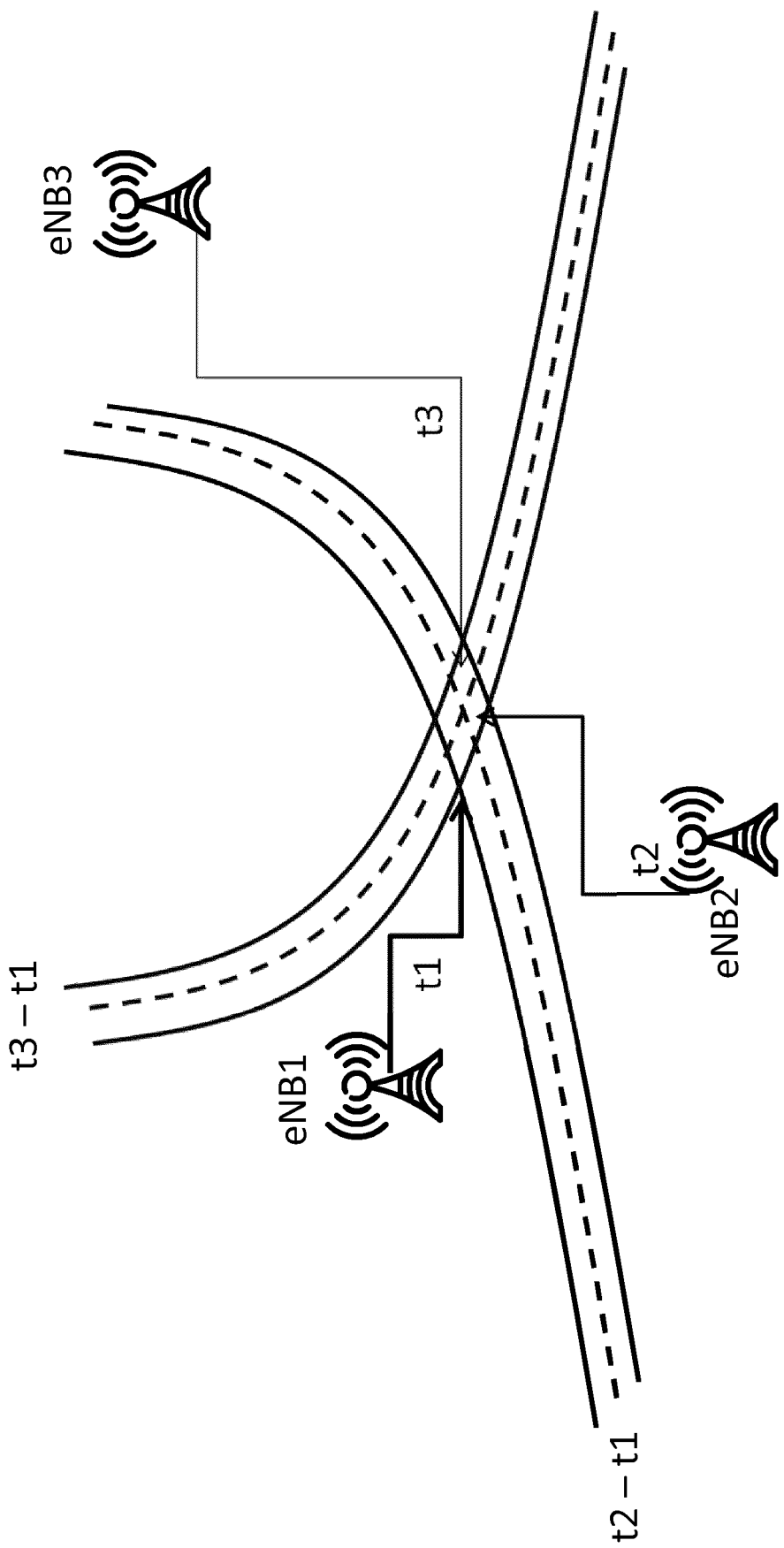
FIG. 1 is an overview illustrating 'Observed Time Difference of Arrival'-concept according to prior art.
Figure 2A:
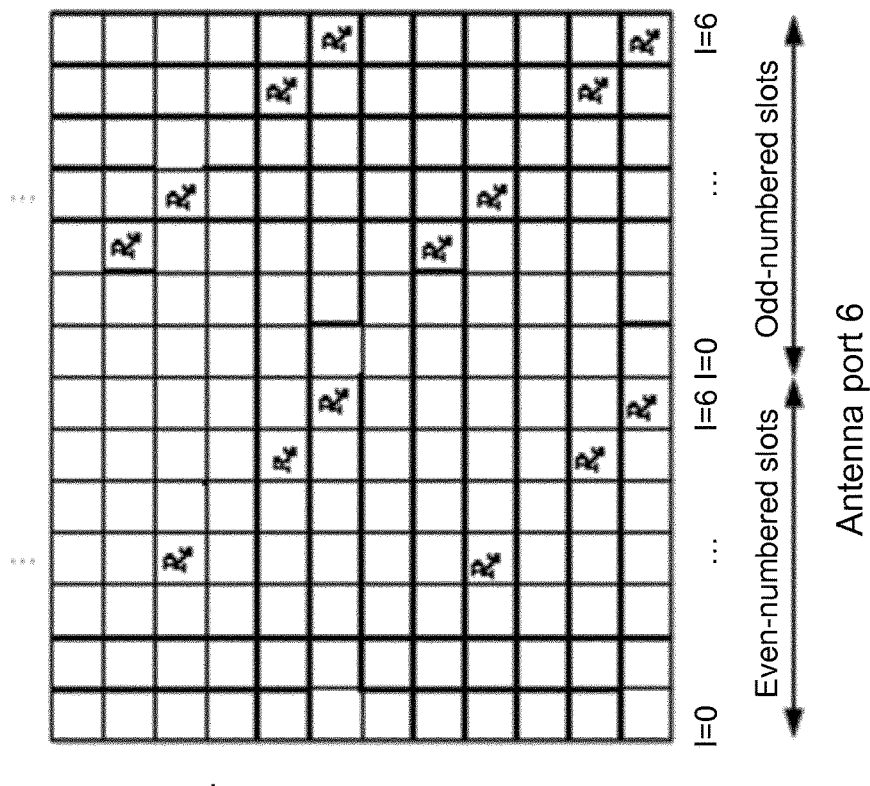
FIGS. 2a and 2b illustrate time/frequency structures.
Figure 2B:
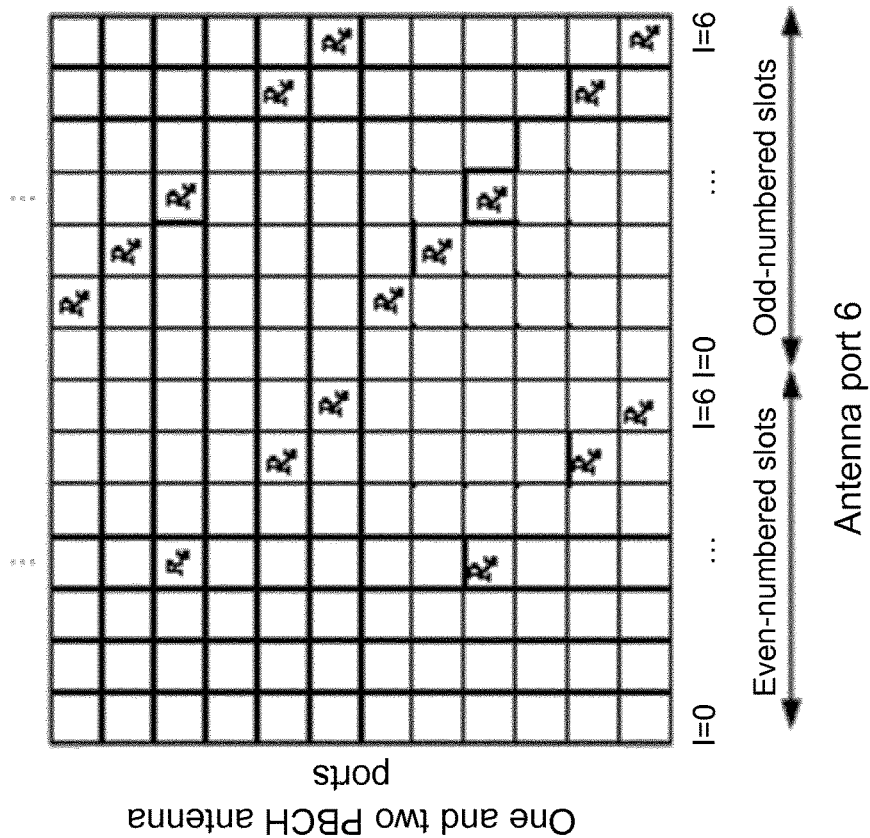
Figure 3B:
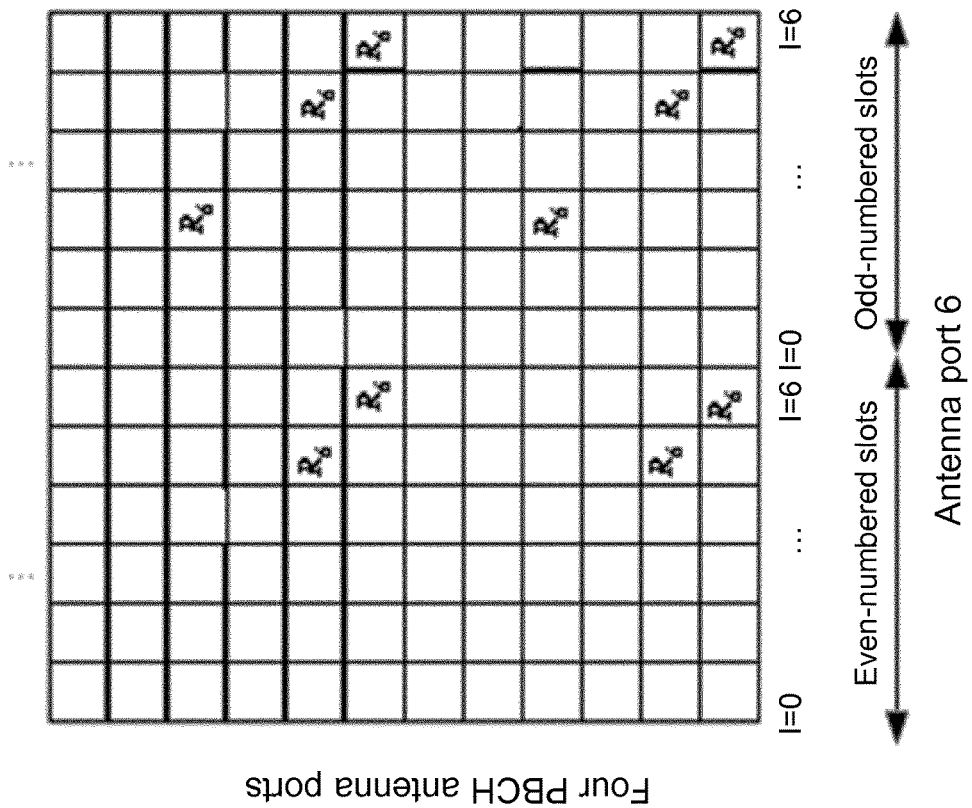
FIGS. 3a and 3b illustrate time/frequency structures.
Figure 3A:
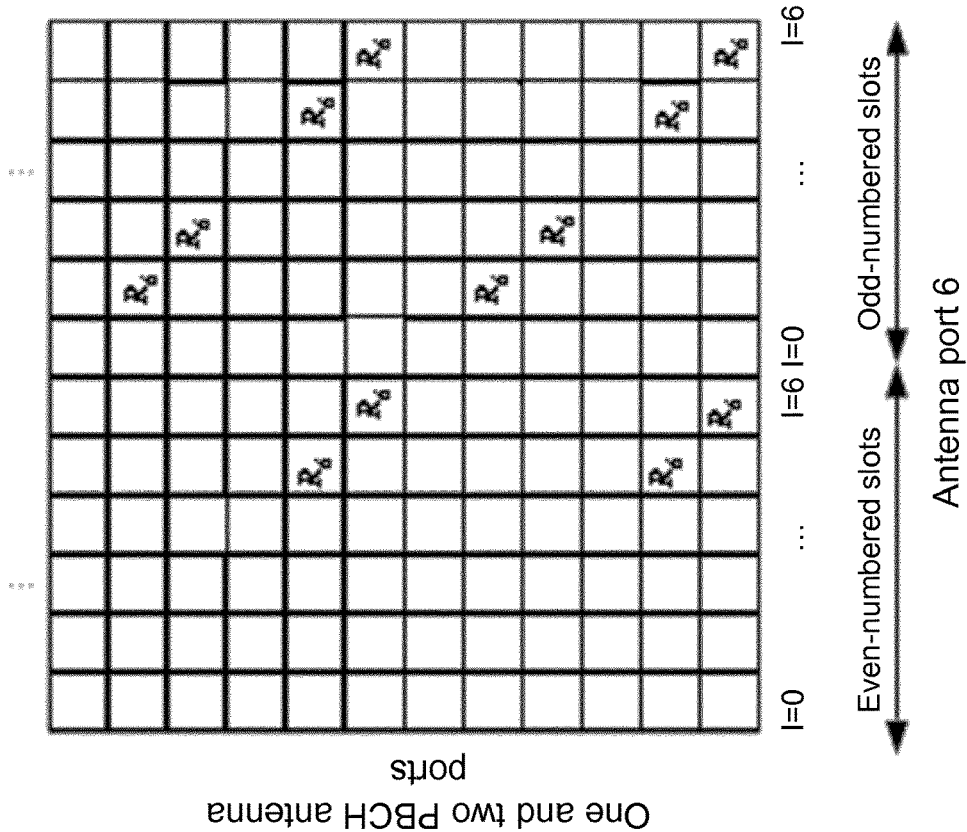
Figure 4:
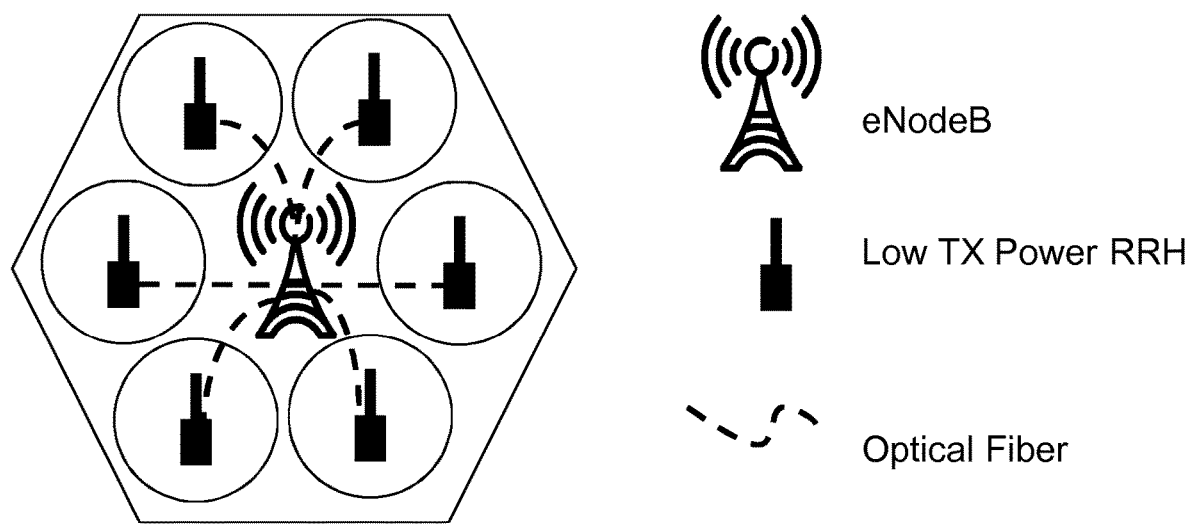
FIG. 4 is an overview illustrating an eNodeB and a plurality of low TX Power RRHs.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 5:
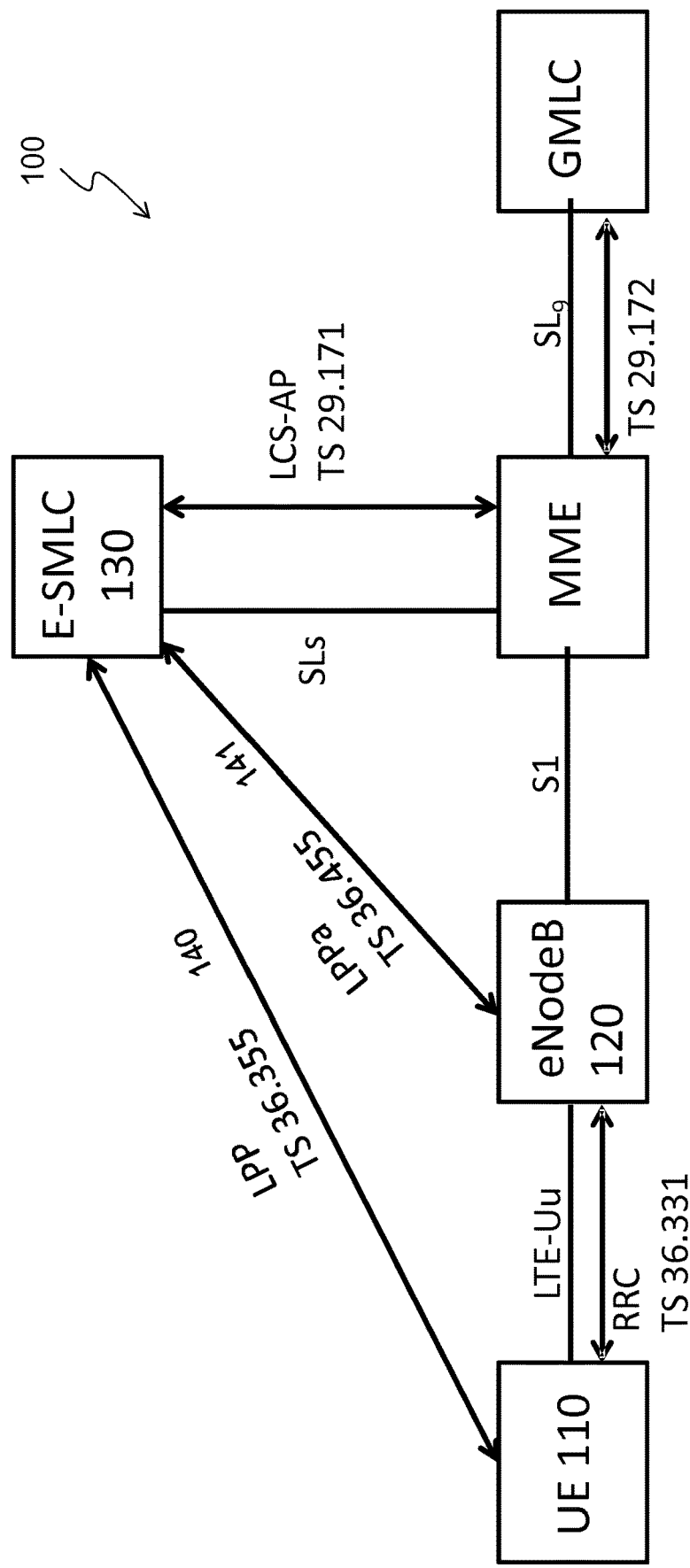
FIG. 5 is a further overview illustrating an exemplifying network in which embodiments herein may be implemented.

FIG. 5 depicts an exemplifying network 100 in which embodiments herein may be implemented. In this example, the network 100 is a Long-Term Evolution (LTE), network.

In other examples, the network 100 may be any cellular or wireless communication system, such as Universal Mobile Telecommunication System (UMTS) and Worldwide Interoperability for Microwave Access (WiMAX), a Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system. It should be noted that although terminology from 3GPP LTE has been used herein to explain the example embodiments, this should not be seen as limiting the scope of the example embodiments to only the aforementioned system.

In the network 100, a positioning architecture is illustrated. The network 100 may be said to comprise a user equipment 110. This means that the wireless communication device 110 is present in the network 100.

Furthermore, a radio transmitter 120, such as a radio network node, an eNodeB or the like, is shown in FIG. 5. The cellular network 100 may comprise the radio transmitter 120. In some examples, the user equipment 110 is served by to the radio transmitter 120. A radio network node may in some examples control one or more radio transmitters, such as TPs, via optical fibers.

Moreover, the network 100 comprises a network node 130, such as evolved Serving Mobile Location Centre (E-SMLC) or the like.

The network node 130 may communicate 140, e.g. over LPP, with the user equipment 110. This communication may include user transmissions both to and from the user equipment 110.

The network node 130 may communicate 141, e.g. over LPPa, with the radio transmitter 120. This communication may include user transmissions both to and from the radio transmitter 120.

Moreover, FIG. 5 illustrates a Mobility Management Entity (MME) and a Gateway Mobile Location Centre (GMLC) for completeness of the positioning architecture.

As used herein, the term "radio transmitter" may refer to a Base Station System (BSS), a Radio Network Controller (RNC), a Radio Base Station (RBS), an evolved Node B (eNB), a control node controlling one or more Remote Radio Units (RRUs), an access point, a low TX Power Remote Radio Head (RRH), a transmission point or the like.

As used herein, the term "user equipment" may refer to a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Figure 6:
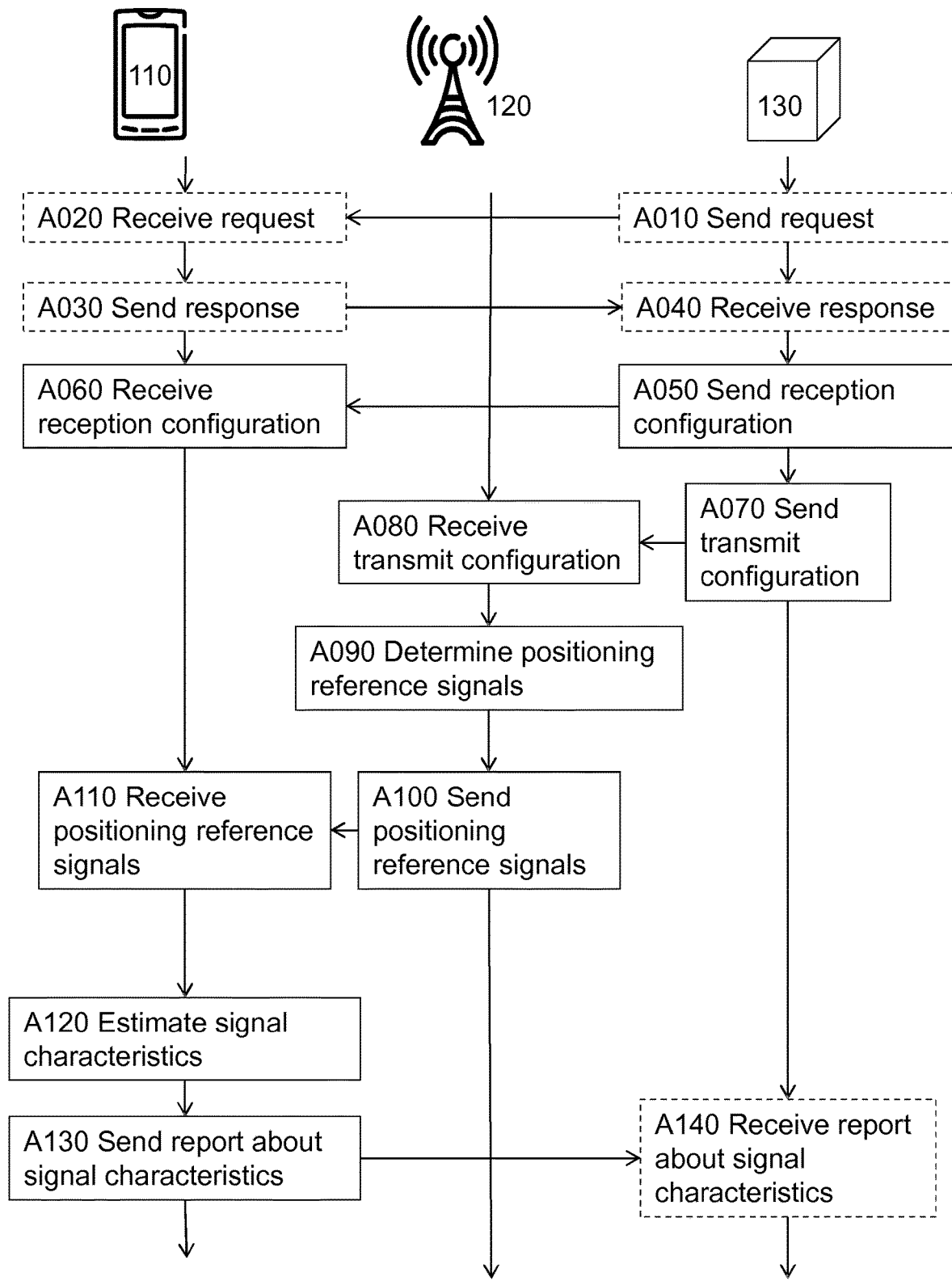
FIG. 6 is a combined signaling and flowchart illustrating embodiment of the methods herein.

FIG. 6 illustrates an exemplifying method according to embodiments herein when implemented in the network 100 of FIG. 5.

The user equipment 110 may perform a method for managing positioning reference signals. As an example, the user equipment 110 may perform a method for managing a reception configuration relating to positioning reference signals.

The radio transmitter 120 may perform a method for managing positioning reference signals. As an example, the radio transmitter 120 may perform a method for managing a transmit configuration relating to positioning reference signals.

The network node 130 may perform a method for configuring positioning reference signals. As an example, the network node 130 may perform a method for providing configurations, such as the reception configuration and/or the transmit configuration, relating to positioning reference signals.

Typically, the reception configuration is provided over LPP and the transmit configuration is provided over LPPa. According to the embodiments herein, these configurations may be extended as illustrated in the tables further below. In existing configurations, a physical cell identity is specified, but not an identifier depending on the existence of multiple cells with the same physical cell identity. Notably, according to the embodiments herein, the cell identity may comprise one of the physical cell identity, an extended cell identity and the like. The extended cell identity and its relation to the physical cell identity will be explained further below.

Briefly, the embodiments herein propose an identifier, different from the physical cell identity and the extended cell identity, to be used for determination of positioning reference signals. In this manner, different positioning reference signals may be generated for different cells, e.g. radio transmitters, even though they share a common physical cell identity. Moreover, the user equipment 110 is able to allow the network node 130 to distinguish reports, from the user equipment 110, of signals characteristics for the common physical cell identity by means of the identifier.

Moreover, according to some embodiments, the cell identity may comprise one of the physical cell identity and an extended cell identity. The extended cell identity will be discussed in more detail after the description of the methods of FIG. 6.

One or more of the following actions may be performed in any suitable order.

When introducing the generation of positioning reference signals as disclosed herein, support for such positioning reference signals may be associated with a capability of the UE. Therefore, in one embodiment, the network node 130 obtains capability information from the user equipment 110 as illustrated Actions A010 to A040.

Action A010

The network node 130 sends, to a user equipment 110, a request for capabilities, such as a RequestCapabilities message or the like. The request for capabilities may specifically relate to support for positioning reference signals based on the identifier.

Action A020

Subsequent to action A010, the user equipment 110 may receive, from the network node 130, the request for capabilities.

Action A030

Once the request is received by the user equipment 110, the user equipment 110 may check, e.g. a release version or the like, to find its, i.e. the user equipment's 110, capabilities. Then, the user equipment 110 may send, to the network node 130, a response relating to capabilities, wherein the response includes a first indication regarding support for positioning reference signals based on the identifier. The response message may be a ProvideCapabilities message.

Moreover, the response may include a second indication regarding support for positioning reference signals based on the extended cell identity.

Action A040

Subsequent to action A030, the network node 130 may receive, from the user equipment 110, the response relating to capabilities. As mentioned, the response includes the first indication regarding support for positioning reference signals based on an identifier for determining of positioning reference signals.

The response may include a second indication regarding support for positioning reference signals based on the extended cell identity.

Action A050

For example, upon receiving a command or request (not shown in FIG. 6) relating to a position of the user equipment 110, the network node 130 sends a reception configuration of positioning reference signals to the user equipment 110. The reception configuration comprises a cell identity relating to the radio transmitter 120 and an identifier for determining of positioning reference signals. The reception configuration may thus be dependent on the response received in action A040. Typically, it is only when the user equipment 110 supports positioning reference signals based on the identity that the identity is included in the reception configuration.

Action A060

Subsequent to action A050, the user equipment 110 receives, from the network node 130, the reception configuration of the positioning reference signals relating to the radio transmitter 120. As mentioned, the reception configuration comprises the cell identity relating to the radio transmitter 120 and the identifier for determining of the positioning reference signals, e.g. when appropriate.

Action A070

Furthermore, now returning to the network node 130, the network node 130 sends, to the radio transmitter 120, a transmit configuration of positioning reference signals. The transmit configuration comprises the cell identity and the identifier in correspondence with the reception configuration sent in action A050. This action may be performed before action A050.

However, before action A050 and A070, the network node 130 may determine a value of the identifier, given the user equipment 110 supports use of the identifier.

According to a first embodiment, the network node 130 sets the identifier randomly for each radio transmitter, aka radio network node.

According to a second embodiment, the network node 130 can, using location information relating to the radio transmitters, determine the identifier for radio transmitters 120 with the same physical cell identity. For example, two radio transmitters with same PCI that are closely located should be assigned different identifiers, i.e. different values of the identifier, to ensure orthogonal PRS sequences for robust positioning.

According to a third embodiment, the network node 130 sets the identifier based on prior UE RSTD measurement reports, for example, if many erroneously RSTD measurements relates to a certain radio transmitter 120, the network node 130 assigns a identifier to that radio transmitter 120 to and thus generates another orthogonal PRS sequence.

According to a fourth embodiment, the network node 130 sets the identifier based the UE capability report, the identifier is used if one or more devices, such as the user equipment 110, supports positioning reference signals based on the identifier. The network node 130 then configures the radio transmitter 120 with the identifier according to any of the embodiments above, e.g. randomly, location info, or RSTD accuracy reports.

The first and second embodiments above may set the identifier upon deploying the network 100, while the third and fourth embodiment updates the identifier during operation of the network 100.

Action A080

Subsequent to action A070, the radio transmitter 120 receives, from the network node 130, the transmit configuration of the positioning reference signals. As mentioned, the transmit configuration comprises the cell identity relating to the radio transmitter 120 and the identifier for determining of positioning reference signals.

Action A090

Now that the radio transmitter 120 has received the transmit configuration, the radio transmitter 120 determines the positioning reference signals based on the cell identity and the identifier. See e.g. section "PRS sequence generation" below.

The determining of the positioning reference signals may further be based on the extended cell identity.

Action A100

Once the radio transmitter 120 has been configured as a result of action A080, the radio transmitter 120 sends the positioning reference signals, e.g. according to the received configuration.

Action A110

Subsequent to action A100, the user equipment 110 receives, according to the reception configuration, the positioning reference signals from the radio transmitter 120. In order to the user equipment 110 to be aware of when the positioning reference signals are expected to be received the user equipment 110 determines the $C_{init}$ as described below in section "PRS sequence generation".

Action A120

Upon reception of the positioning reference signals, the user equipment 110 estimates, based on the positioning reference signals, signal characteristics relating to a position of the user equipment 110. The signals characteristics may be signal strength, signal power and the like.

Action A130

Subsequent to action A120, the user equipment 110 sends, to the network node 130, a report about the estimated signal characteristics. The report may include the identifier and, optionally, information about whether or not the extended cell identity has been used to create orthogonal positioning reference signals.

Action A140

Subsequent to action A130, the network node 130 may receive, from the user equipment 110, the report about the estimated signal characteristics relating to the positioning reference signal sequence.

PRS Sequence Generation

The highest value of $c_{init}$ occurs when $n_s=19$, $l=6$, $N_{ID}^{cell}=503$, and $N_{CP}=0$, that corresponds to $c_{init}=151582702$ and it can be represented using the 28 right-most bits of $c_{init}$.

The number of possible PRS sequences should preferably be set as large as possible in order to minimize the probability of colliding PRS patterns. Based on the existing 28-bit space, the 3-leftmost bits can be used to create more orthogonal PRS sequences.

The formula for increasing the number of PRS sequences should use the complete 31-bit space of c_init, while ensuring the combination of input, e.g. N_CP, ns, l, $N_{ASID}$, N^cell_id, generates a unique c_init value. The ASID element could be introduced to c_init according to the following examples:

$$c_{init}^* = 2^{10} \cdot (7 \cdot (n_s+1)+l+1) \cdot (2 \cdot N_{ID}^{cell}+1) + 2 \cdot N_{ID}^{cell} + N_{CP} + 2^{28} \cdot N_{ASID}$$

Figure 10:
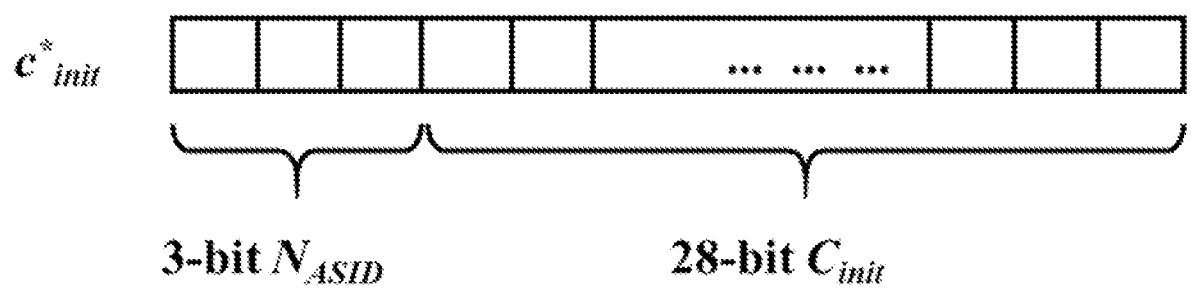
FIG. 10 is a table illustrating an example initialization of $c_{init}$.

In this example, the 3 left-most bits comprising the $N_{ASID}$ field can take values in range of 0 7 and the solution generates 8*504=4032 orthogonal PRS sequences. The proposed $c^*_{init}$, is illustrated in FIG. 10.

In this context, the identifier for determining of positioning reference signals is exemplified by the $N_{ASID}$, aka ASID.

In one embodiment, $N_{ASID}$ is representing the TP-ID. In another embodiment, it represents a value to reduce the PCI ambiguity problem. In another embodiment, $N_{ASID}$ can be obtained as a function of the cell portion ID. For example, if the total of the cell portion IDs is equal or less than 8, $N_{ASID}$ represents the cell portion ID. Otherwise, $N_{ASID}$ represents cell portion ID mod 8.
As another example:

$$c_{init} = 2^{28} \cdot \lfloor N_{ASID}/512 \rfloor + 2^{10} \cdot (7 \cdot (n_s+1)+l+1) \cdot (2 \cdot (N_{ASID} \bmod 512)+1) + 2 \cdot (N_{ASID} \bmod 512) + N_{CP}$$

In this example, $N_{ASID}$ is in the range of 0 . . . 4095.

Also in this example, the 3-leftmost bits is set by the ASID element, but also the 28-rightmost bits is set by using ASID, this allows generating 4096 unique sequences in comparison with 4032 sequences in the first example.

The frequency shift is currently based on the PCI mod 6, by introducing the $N_{ASID}$ element for TP-specific PRS, it can be beneficial for TPs in same cell to use different frequency shift for reducing the interference. The frequency shift should be optionally based on the $N_{ASID}$ or using the existing PCI mod 6 solution. This optionality can be set in the LPP by extending the protocol with an indication comprising whether the frequency shift is based on the $N_{ASID}$ or PCI.

The LPP is extended to include the $N_{ASID}$ and the option for frequency shift accordingly.

In another embodiment, the frequency shift is set by the v_shift containing a number between 0-5 where the number indicates the frequency shift. This allows more configurability at the network side and possibility to dynamically adjust the v_shift.

In another embodiment, the v_shift elements indicates that v_shift=mod($N_{ASID}$+PCI, 6).

In another embodiment, in the situation where two same-PCI TPs unfortunately own the same $N_{ASID}$ due to for example highly dense deployment, additional PRS muting pattern can be configured and applied to both TPs.

In yet another embodiment, the cell ID is extended to also encompass virtual cell IDs that are introduced as cellID values above 503.

In one mode, these are defined by extending the cell ID field beyond 503 in the following manner:

cellID_ext (extPhysCellID)=504+virtual cell ID, where the virtual cell IDs are 0, 1, . . . , (max_no_virtual_cell_IDs−1).

If the max_no_virtual_cell_IDs is 388 or less, then it is possible to still leave three bits for ASID. The procedure with virtual cell IDs is illustrated in FIGS. 12 and 13.

In another mode of the invention, the physical cell ID is replaced by a new attribute physCellID_rel14 with range (0 . . . 891) (or narrower), defined as $$N_{ID}^{cell} = physCeLLID_{rel14} = \begin{cases} physCellID, & physCellID_{rel14} < 504 \\ extPhysCellID, & physCellID_{rel14} > 503 \end{cases}$$

where extPhysCellID can encode cell portions for example.

Moreover, the base station, such as the radio transmitter 120, may also receive a request from the network node 130 regarding its OTDOA configuration via the LPPa protocol (3GPP TS 36.455, section 9.2.7), OTDOA Cell Information.

```
-- ASN1START
OTDOA-ReferenceCellInfo  ::= SEQUENCE {
    physCellId              INTEGER (0..503),
    cellGlobalId            ECGI                          OPTIONAL,          -- Need ON
    earfcnRef               ARFCN-ValueEUTRA              OPTIONAL,          --
Cond NotSameAsServ0
    antennaPortConfig       ENUMERATED {ports1-or-2, ports4, ... }
                                                          OPTIONAL,          -- Cond
NotSameAsServ1
    cpLength                ENUMERATED { normal, extended, ... },
    prsInfo                 PRS-Info                      OPTIONAL,          -- Cond
PRS
    ...,
    [[ earfcnRef-v9a0       ARFCN-ValueEUTRA-v9a0         OPTIONAL           --
Cond NotSameAsServ2
    ]],
    [[ N_ASID               INTEGER (0...7)               OPTIONAL           --
       v_shift              ENUMERATED {N_ASID,PCI}       OPTIONAL
    ]]
}
-- ASN1STOP
```

This IE contains OTDOA information of a cell. This protocol can be extended, see underlined IEs in the table below, to encompass the ASID:

| IE/Group Name | Presence | Range | IE type and reference | Semantics description |
|---|---|---|---|---|
| OTDOA Cell Information | | 1 ... <maxnoOTDOAtypes> | | |
| >CHOICE OTDOA Cell Information Item | M | | | |
| >>PCI | M | | INTEGER (0 ... 891,...) | Extended Physical Cell ID |
| >>Cell ID | M | | ECGI 9.2.6 | |
| >>ASID | O | | INTEGER (0 ... 7) | Additional sequence ID |
| >>TAC | M | | OCTET STRING(2) | Tracking Area Code |
| >>EARFCN | M | | INTEGER (0 ... 65535, ..., 65536 ... 262143) | Corresponds to $N_{DL}$ for FDD and $N_{DL/UL}$ for TDD in ref. TS 36.104 |
| >>PRS Bandwidth | M | | ENUMERATED (bw6, bw15, bw25, bw50, bw75, bw100, ...) | Transmission bandwidth of PRS |
| >>PRS Configuration Index | M | | INTEGER (0 ... 4095, ...) | PRS Configuration Index, ref TS 36.211 |
| >>CP Length | M | | ENUMERATED (Normal, Extended, ...) | Cyclic prefix length of the PRS |
| >>Number of DL Frames | M | | ENUMERATED (sf1, sf2, sf4, sf6, ...) | Number of consecutive downlink subframes $N_{PRS}$ with PRS, ref TS 36.211 |
| >>Number of Antenna Ports | M | | ENUMERATED (n1-or-n2, n4, ...) | Number of used antenna ports, where n1-or-n2 corresponds to 1 or 2 ports, n4 corresponds to 4 ports |
| >>SFN Initialisation Time | M | | BIT STRING (64) | Time in seconds relative to 00:00:00 on 1 Jan. 1900 (calculated as continuous time without leap seconds and traceable to a common time reference) where binary encoding of the integer part is in the first 32 bits and binary encoding of the fraction part in the last 32 bits. The fraction part is expressed with a granularity of $1/2^{**}32$ second. |
| >>E-UTRAN Access Point Position | M | | 9.2.8 | The configured estimated geographical position of the antenna of the cell. |
| >>PRS Muting Configuration | M | | 9.2.9 | The configuration of positioning reference signals muting pattern, when applicable |

| Range bound | Explanation |
|---|---|
| maxnoOTDOAtypes | Maximum no. of OTDOA information types that can be requested and reported with one message. Value is 63. |

Example 1: PCI Ambiguity Scenario in Dense Network Deployment

This example illustrates the PCI ambiguity problem by considering two cells that both has PCI=0, the cells are denoted with $PCI_{0,1}$ and $PCI_{0,2}$. The two cells could both be hearable in dense deployment with activated muting procedure. In the existing solution, the two cells will get the same PRS sequence and the UE cannot separate the two signals, even if the UE could distinguish the signals, it cannot report the RSTD for $PCI_{0,1}$ and $PCI_{0,2}$, since the LPP does not provide a unique identifier.

According to at least some embodiments herein, the network 130 may assign $PCI_{0,1}$ to use $N_{ASID}=0$ and $PCI_{0,2}$ to use $N_{ASID}=1$. This would generate orthogonal sequences and thus create beneficial interference conditions, additionally the cells could be uniquely identified in LPP by using the $N_{ASID}$ element.

Example 2: PCI Ambiguity Scenario for TPs Corresponding to the Same Macro Cell In this example, some embodiments herein is used for creating a TP-specific PRS. Assume 6 TPs connected to a macro cell via fiber according to FIG. 5. The 6 cells can be assigned with orthogonal PRS sequences using the $N_{ASID}$ element, for example TP 1 uses $N_{ASID}=0$, TP2 uses $N_{ASID}=1$, and so on. Note that these embodiments also provide beneficial interference properties with adjacent cells with multiple non-collocated TP, since the TP-specific PRS is not only unique within the cell, but also throughout the area of 504 cells.

Figure 7A:
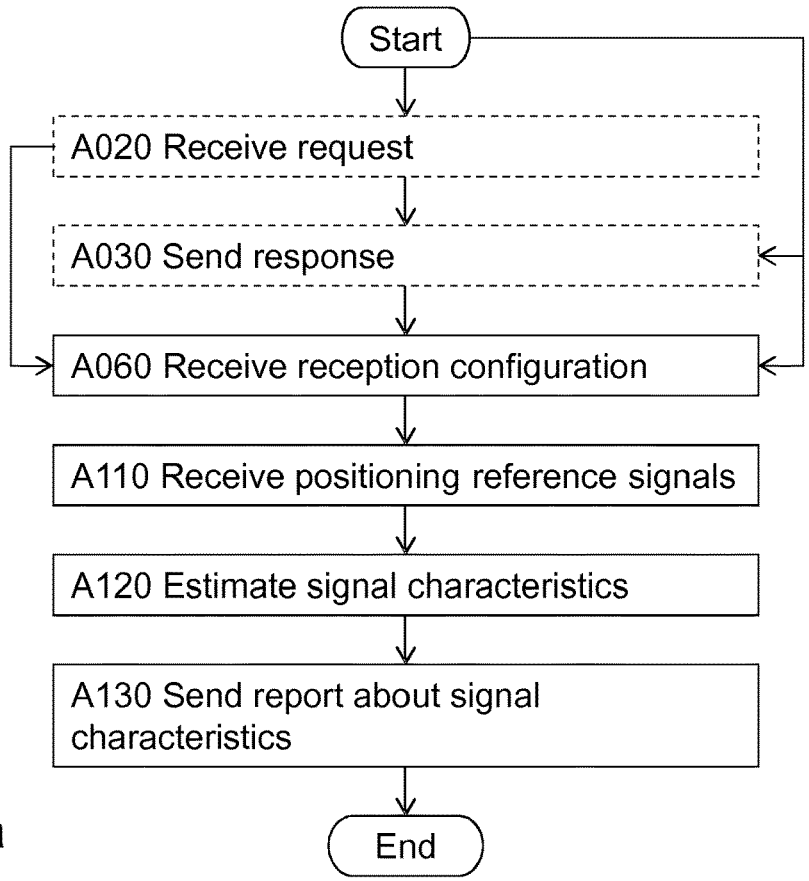
FIG. 7a is a flowchart illustrating embodiments of the methods in the user equipment 110.

In FIG. 7a, a schematic flowchart of exemplifying methods in the user equipment 110 is shown. The same reference numerals as above have been used to denote the same or similar features, in particular the same reference numerals have been used to denote the same or similar actions. Accordingly, the user equipment 110 performs a method for managing positioning reference signals.

As mentioned, the cell identity may comprise one of the physical cell identity and an extended cell identity.

One or more of the following actions may be performed in any suitable order.

Action A020

The user equipment 110 may receive, from the network node 130, the request for capabilities.

Action A030

Once the request is received by the user equipment 110, the user equipment 110 may check, e.g. a release version or the like, to find its, i.e. the user equipment's 110, capabilities. Then, the user equipment 110 may send, to the network node 130, a response relating to capabilities, wherein the response includes a first indication regarding support for positioning reference signals based on the identifier. The response message may be a ProvideCapabilities message.

Moreover, the response may include a second indication regarding support for positioning reference signals based on the extended cell identity.

Action A060

Furthermore, the user equipment 110 receives, from the network node 130, the reception configuration of the positioning reference signals relating to the radio transmitter 120. As mentioned, the reception configuration comprises the cell identity relating to the radio transmitter 120 and the identifier for determining of the positioning reference signals, e.g. when appropriate.

Action A110

Subsequent to action A100, the user equipment 110 receives, according to the reception configuration, the positioning reference signals from the radio transmitter 120. In order to the user equipment 110 to be aware of when the positioning reference signals are expected to be received the user equipment 110 determines the $C_{init}$ as described below in section "PRS sequence generation".

Action A120

Upon reception of the positioning reference signals, the user equipment 110 estimates, based on the positioning reference signals, signal characteristics relating to a position of the user equipment 110. The signals characteristics may be signal strength, signal power and the like.

Action A130

Subsequent to action A120, the user equipment 110 sends, to the network node 130, a report about the estimated signal characteristics. The report may include the identifier and, optionally, information about whether or not the extended cell identity has been used to create orthogonal positioning reference signals.

Figure 7B:
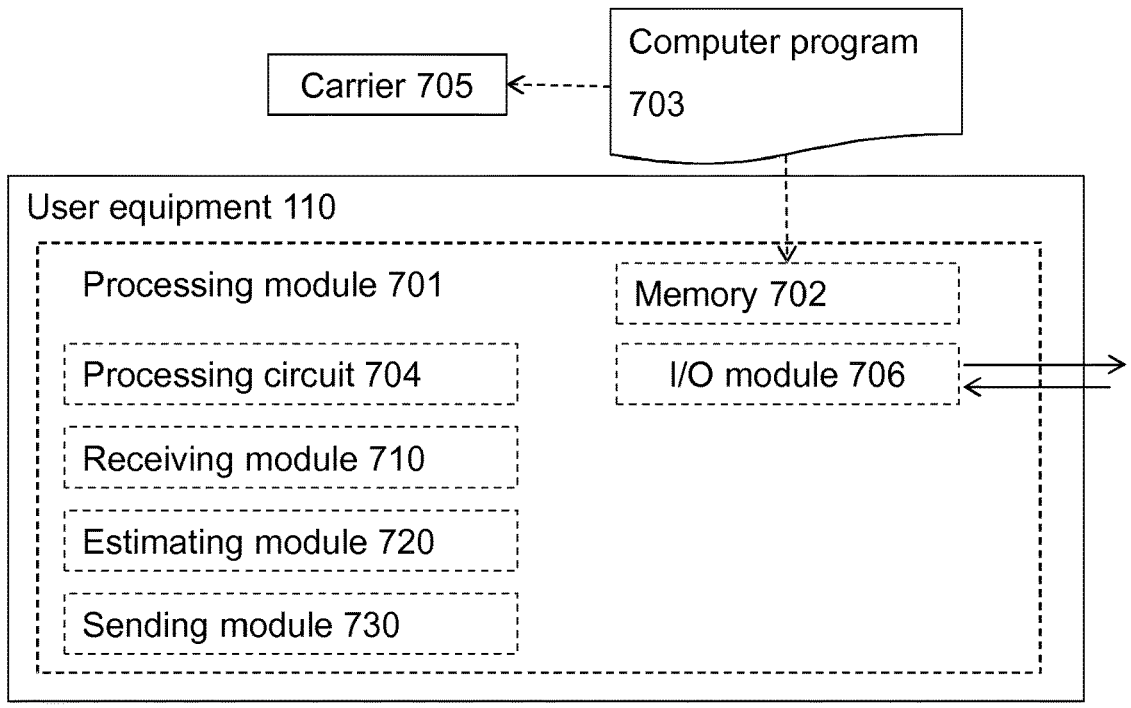
FIG. 7b is a block diagram illustrating embodiments of the user equipment 110.

With reference to FIG. 7b, a schematic block diagram of embodiments of the user equipment 110 of FIG. 1 is shown.

The user equipment 110 may comprise a processing module 701, such as a means for performing the methods described herein. The means may be embodied in the form of one or more hardware modules and/or one or more software modules The user equipment 110 may further comprise a memory 702. The memory may comprise, such as contain or store, instructions, e.g. in the form of a computer program 703, which may comprise computer readable code units.

According to some embodiments herein, the user equipment 110 and/or the processing module 701 comprises a processing circuit 704 as an exemplifying hardware module. Accordingly, the processing module 701 may be embodied in the form of, or 'realized by', the processing circuit 704. The instructions may be executable by the processing circuit 704, whereby the user equipment 110 is operative to perform the methods of FIG. 6. As another example, the instructions, when executed by the user equipment 110 and/or the processing circuit 704, may cause the user equipment 110 to perform the method according to FIG. 6.

FIG. 7b further illustrates a carrier 705, or program carrier, which comprises the computer program 703 as described directly above.

In some embodiments, the processing module 701 comprises an Input/Output module 706, which may be exemplified by a receiving module and/or a sending module as described below when applicable.

In further embodiments, the user equipment 110 and/or the processing module 701 may comprise one or more of a receiving module 710, an estimating module 720, and a sending module 730 as exemplifying hardware modules. In other examples, one or more of the aforementioned exemplifying hardware modules may be implemented as one or more software modules.

Accordingly, the user equipment 110 is configured for managing positioning reference signals.

Therefore, according to the various embodiments described above, the user equipment 110 and/or the processing module 701 and/or the receiving module 710 is configured for receiving, from a network node 130, a reception configuration of the positioning reference signals relating to a radio transmitter 120, wherein the reception configuration comprises a cell identity relating to the radio transmitter 120 and an identifier for determining of the positioning reference signals.

The user equipment 110 and/or the processing module 701 and/or the receiving module 710, or another receiving module (not shown), is configured for receiving, according to the reception configuration, the positioning reference signals from the radio transmitter 120.

The user equipment 110 and/or the processing module 701 and/or the estimating module 720 is configured for estimating, based on the positioning reference signals, signal characteristics relating to a position of the user equipment 110.

Moreover, the user equipment 110 and/or the processing module 701 and/or the receiving module 730 is configured for sending, to the network node 130, a report about the estimated signal characteristics.

The cell identity may comprise one of a physical cell identity and an extended cell identity.

The user equipment 110 and/or the processing module 701 and/or the receiving module 710, or a further receiving module (not shown), may be configured for receiving, from the network node 130, a request for capabilities. Moreover, the user equipment 110 and/or the processing module 701 and/or the sending module 730, or another sending module (not shown) may be configured for sending, to the network node 130, a response relating to capabilities, wherein the response includes a first indication regarding support for positioning reference signals based on the identifier.

The response may include a second indication regarding support for positioning reference signals based on the extended cell identity.

Figure 8A:
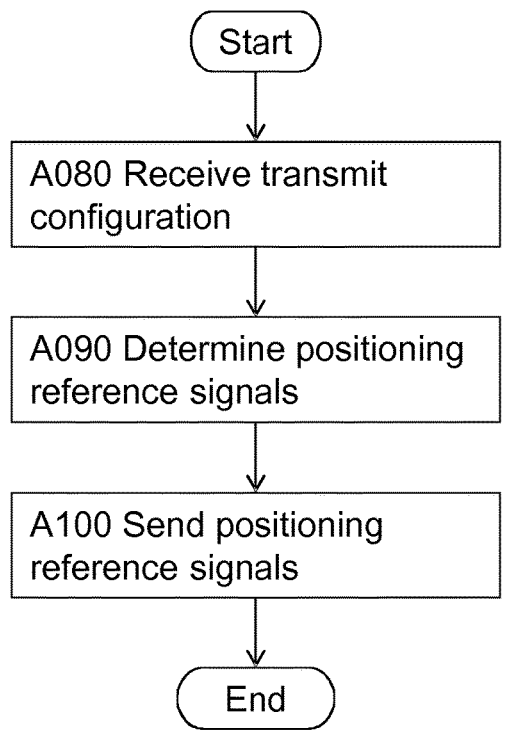
FIG. 8a is a flowchart illustrating embodiments of the methods in the radio transmitter 120.

In FIG. 8a, a schematic flowchart of exemplifying methods in the radio transmitter 120 is shown. Again, the same reference numerals as above have been used to denote the same or similar features, in particular the same reference numerals have been used to denote the same or similar actions. Accordingly, the radio transmitter 120 performs a method for managing positioning reference signals.

As mentioned, the cell identity may comprise one of the physical cell identity and an extended cell identity.

One or more of the following actions may be performed in any suitable order.

Action A080

The radio transmitter 120 receives, from the network node 130, the transmit configuration of the positioning reference signals. As mentioned, the transmit configuration comprises the cell identity relating to the radio transmitter 120 and the identifier for determining of positioning reference signals.

Action A090

Now that the radio transmitter 120 has received the transmit configuration, the radio transmitter 120 determines the positioning reference signals based on the cell identity and the identifier. See e.g. section "PRS sequence generation" below.

The determining of the positioning reference signals may further be based on the extended cell identity.

Action A100

Once the radio transmitter 120 has been configured as a result of action A080, the radio transmitter 120 sends the positioning reference signals, e.g. according to the received configuration.

Figure 8B:
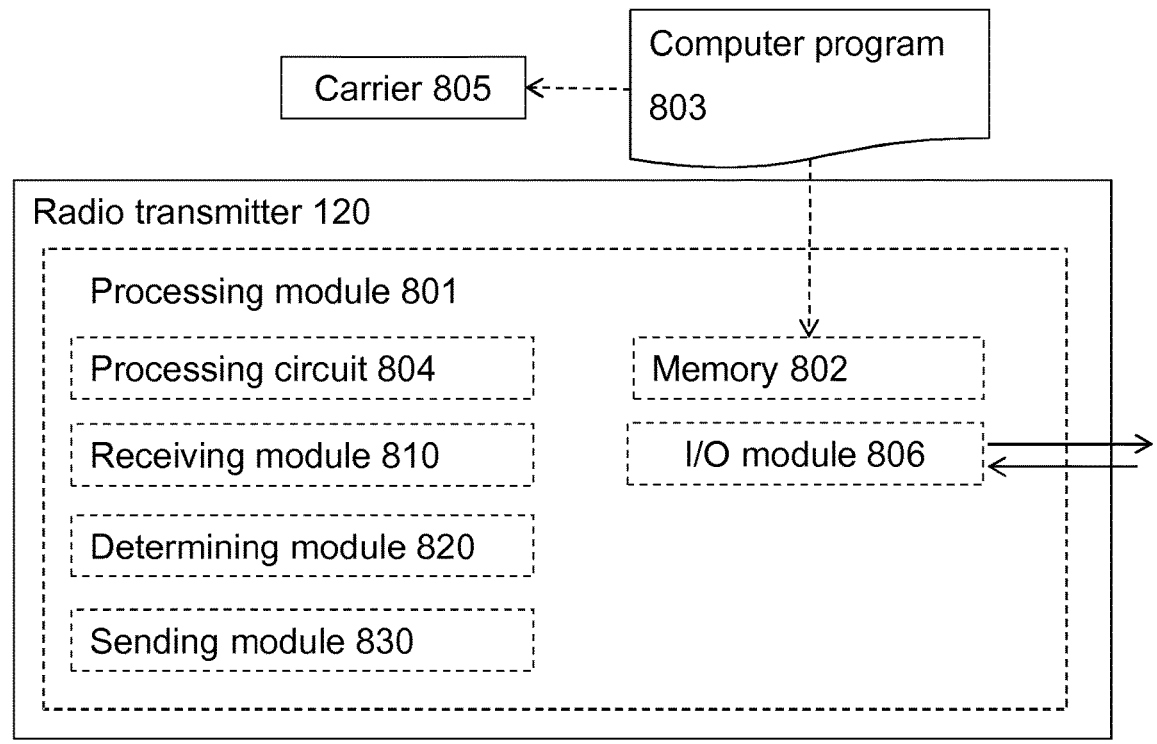
FIG. 8b is a block diagram illustrating embodiments of the radio transmitter 120.

With reference to FIG. 8b, a schematic block diagram of embodiments of the radio transmitter 120 of FIG. 1 is shown.

The radio transmitter 120 may comprise a processing module 801, such as a means for performing the methods described herein. The means may be embodied in the form of one or more hardware modules and/or one or more software modules The radio transmitter 120 may further comprise a memory 802. The memory may comprise, such as contain or store, instructions, e.g. in the form of a computer program 803, which may comprise computer readable code units.

According to some embodiments herein, the radio transmitter 120 and/or the processing module 801 comprises a processing circuit 804 as an exemplifying hardware module. Accordingly, the processing module 801 may be embodied in the form of, or 'realized by', the processing circuit 804. The instructions may be executable by the processing circuit 804, whereby the radio transmitter 120 is operative to perform the methods of FIG. 6. As another example, the instructions, when executed by the radio transmitter 120 and/or the processing circuit 804, may cause the radio transmitter 120 to perform the method according to FIG. 6.

FIG. 8b further illustrates a carrier 805, or program carrier, which comprises the computer program 803 as described directly above.

In some embodiments, the processing module 801 comprises an Input/Output module 806, which may be exemplified by a receiving module and/or a sending module as described below when applicable.

In further embodiments, the radio transmitter 120 and/or the processing module 801 may comprise one or more of a receiving module 810, a determining module 820, and a sending module 830 as exemplifying hardware modules. In other examples, one or more of the aforementioned exemplifying hardware modules may be implemented as one or more software modules.

Accordingly, the radio transmitter 120 is configured for managing positioning reference signals.

Therefore, according to the various embodiments described above, the radio transmitter 120 and/or the processing module 801 and/or the receiving module 810 is configured for receiving, from a network node 130, a transmit configuration of the positioning reference signals, wherein the transmit configuration comprises a cell identity relating to the radio transmitter 120 and an identifier for determining of positioning reference signals.

The radio transmitter 120 and/or the processing module 801 and/or the determining module 820 is configured for determining the positioning reference signals based on the cell identity and the identifier.

The radio transmitter 120 and/or the processing module 801 and/or the sending module 830 is configured for sending the positioning reference signals.

The cell identity may comprise one of a physical cell identity and an extended cell identity, wherein the determining of the positioning reference signals further may be based on the extended cell identity.

Figure 9A:
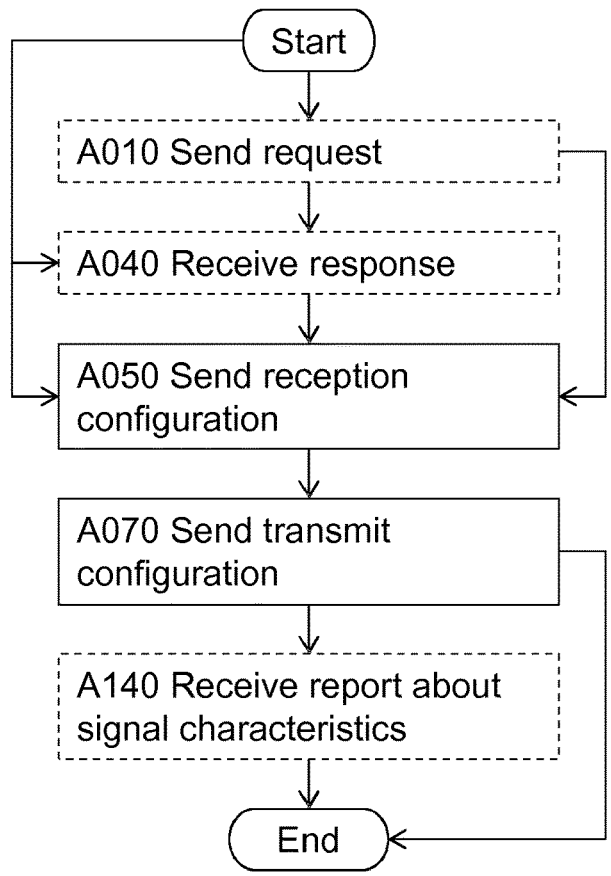
FIG. 9a is a flowchart illustrating embodiments of the methods in the network node 130.

In FIG. 9a, a schematic flowchart of exemplifying methods in the network node 130 is shown. Again, the same reference numerals as above have been used to denote the same or similar features, in particular the same reference numerals have been used to denote the same or similar actions. Accordingly, the network node 130 performs a method for configuring positioning reference signals.

As mentioned, the cell identity may comprise one of the physical cell identity and an extended cell identity.

One or more of the following actions may be performed in any suitable order.

When introducing the generation of positioning reference signals as disclosed herein, support for such positioning reference signals may be associated with a capability of the UE. Therefore, in one embodiment, the network node 130 obtains capability information from the user equipment 110 as illustrated Actions A010 to A040.

Action A010

The network node 130 sends, to a user equipment 110, a request for capabilities, such as a RequestCapabilities message or the like. The request for capabilities may specifically relate to support for positioning reference signals based on the identifier.

Action A040

Furthermore, the network node 130 may receive, from the user equipment 110, the response relating to capabilities. As mentioned, the response includes the first indication regarding support for positioning reference signals based on an identifier for determining of positioning reference signals.

The response may include a second indication regarding support for positioning reference signals based on the extended cell identity.

Action A050

For example, upon receiving a command or request (not shown in FIG. 6) relating to a position of the user equipment 110, the network node 130 sends a reception configuration of positioning reference signals to the user equipment 110. The reception configuration comprises a cell identity relating to the radio transmitter 120 and an identifier for determining of positioning reference signals. The reception configuration may thus be dependent on the response received in action A040. Typically, it is only when the user equipment 110 supports positioning reference signals based on the identity that the identity is included in the reception configuration.

Action A070

Furthermore, the network node 130 sends, to the radio transmitter 120, a transmit configuration of positioning reference signals. The transmit configuration comprises the cell identity and the identifier in correspondence with the reception configuration sent in action A050. This action may be performed before action A050.

Action A140

Moreover, the network node 130 may receive, from the user equipment 110, the report about the estimated signal characteristics relating to the positioning reference signal sequence.

Figure 9B:
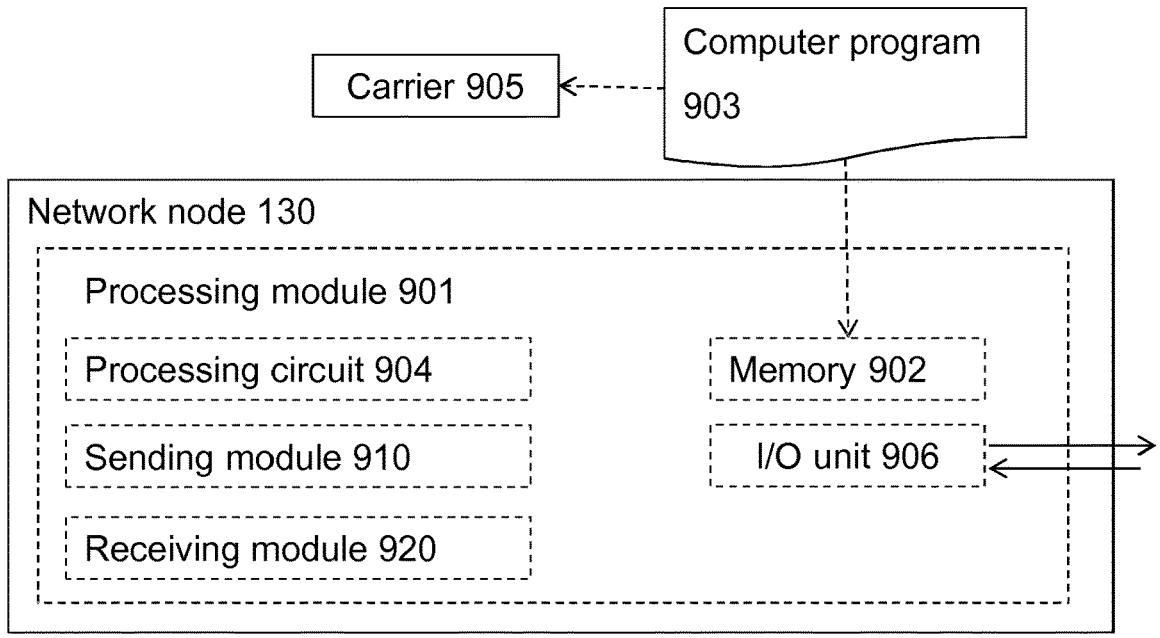
FIG. 9b is a block diagram illustrating embodiments of the network node 130.

With reference to FIG. 9b, a schematic block diagram of embodiments of the network node 130 of FIG. 1 is shown.

The network node 130 may comprise a processing module 901, such as a means for performing the methods described herein. The means may be embodied in the form of one or more hardware modules and/or one or more software modules The network node 130 may further comprise a memory 902. The memory may comprise, such as contain or store, instructions, e.g. in the form of a computer program 903, which may comprise computer readable code units.

According to some embodiments herein, the network node 130 and/or the processing module 901 comprises a processing circuit 904 as an exemplifying hardware module. Accordingly, the processing module 901 may be embodied in the form of, or 'realized by', the processing circuit 904. The instructions may be executable by the processing circuit 904, whereby the network node 130 is operative to perform the methods of FIG. 6. As another example, the instructions, when executed by the network node 130 and/or the processing circuit 904, may cause the network node 130 to perform the method according to FIG. 6.

FIG. 9b further illustrates a carrier 905, or program carrier, which comprises the computer program 903 as described directly above.

In some embodiments, the processing module 901 comprises an Input/Output module 906, which may be exemplified by a receiving module and/or a sending module as described below when applicable.

In further embodiments, the network node 130 and/or the processing module 901 may comprise one or more of a sending module 910, and a receiving module 920 as exemplifying hardware modules. In other examples, one or more of the aforementioned exemplifying hardware modules may be implemented as one or more software modules.

Accordingly, the network node 130 is configured for configuring positioning reference signals.

Therefore, according to the various embodiments described above, the network node 130 and/or the processing module 901 and/or the sending module 910 is configured for sending, to a user equipment 110, a reception configuration of positioning reference signals, wherein the reception configuration comprises a cell identity relating to the radio transmitter 120 and an identifier for determining of positioning reference signals.

Moreover, the network node 130 and/or the processing module 901 and/or the sending module 910, or another sending module (not shown), is configured for sending, to a radio transmitter 120, a transmit configuration of positioning reference signals, wherein the transmit configuration comprises the cell identity and the identifier.

The network node 130 and/or the processing module 901 and/or the receiving module 920 may be configured for receiving, from the user equipment 110, a report about the estimated signal characteristics relating to the positioning reference signal sequence.

The cell identity may comprise one of a physical cell identity and an extended cell identity.

The network node 130 and/or the processing module 901 and/or the sending module 910, or another sending module (not shown), may be configured for sending, to a user equipment 110, a request for capabilities.

The network node 130 and/or the processing module 901 and/or the receiving module 920, or another receiving module (not shown), may be configured for receiving, from the user equipment 110, a response relating to capabilities, wherein the response includes a first indication regarding support for positioning reference signals based on an identifier for determining of positioning reference signals.

The response may include a second indication regarding support for positioning reference signals based on the extended cell identity.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "program carrier", or "carrier", may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a user equipment, for managing positioning reference signals, comprising:
   receiving, from a network node, a reception configuration of the positioning reference signals relating to a radio transmitter, wherein the reception configuration comprises a cell identity relating to the radio transmitter and an identifier for determining of the positioning reference signals, wherein the identifier for the determining of the positioning reference signals comprises an Additional Sequence Identifier (ASID), wherein the ASID is an element of a positioning protocol;
   receiving, according to the reception configuration, the positioning reference signals from the radio transmitter, wherein receiving the positioning reference signals according to the configuration information comprises determining an initialization value ($c_{init}$) indicating when the positioning reference signals are expected to be received, the initialization value ($c_{init}$) determined based on the ASID;
   estimating, based on the positioning reference signals, signal characteristics relating to a position of the user equipment; and
   sending, to the network node, a report about the estimated signal characteristics.

2. The method according to claim 1, wherein the cell identity comprises one of a physical cell identity and an extended cell identity.

3. The method according to claim 1, wherein the method comprises:
   receiving, from the network node, a request for capabilities; and
   sending, to the network node, a response relating to capabilities, wherein the response includes a first indication regarding support for positioning reference signals based on the identifier.

4. The method according to claim 2, wherein the response includes a second indication regarding support for positioning reference signals based on the extended cell identity.

5. A non-transitory computer readable medium comprising a computer program, wherein the computer program comprises computer readable code units which when executed on a user equipment causes the user equipment to:
   receive, from a network node, a reception configuration of the positioning reference signals relating to a radio transmitter, wherein the reception configuration comprises a cell identity relating to the radio transmitter and an identifier for determining of the positioning reference signals, wherein the identifier for the determining of the positioning reference signals comprises an Additional Sequence Identifier (ASID), wherein the ASID is an element of a positioning protocol;
   receive, according to the reception configuration, the positioning reference signals from the radio transmitter, wherein receiving the positioning reference signals according to the configuration information comprises determining an initialization value ($c_{init}$) indicating when the positioning reference signals are expected to be received, the initialization value ($c_{init}$) determined based on the ASID;
   estimate, based on the positioning reference signals, signal characteristics relating to a position of the user equipment; and
   send, to the network node, a report about the estimated signal characteristics.

6. A user equipment configured for managing positioning reference signals, wherein the user equipment is configured for:
- receiving, from a network node, a reception configuration of the positioning reference signals relating to a radio transmitter, wherein the reception configuration comprises a cell identity relating to the radio transmitter and an identifier for determining of the positioning reference signals, wherein the identifier for the determining of the positioning reference signals comprises an Additional Sequence Identifier (ASID), wherein the ASID is an element of a positioning protocol;
- receiving, according to the reception configuration, the positioning reference signals from the radio transmitter, wherein receiving the positioning reference signals according to the configuration information comprises determining an initialization value ($c_{init}$) indicating when the positioning reference signals are expected to be received, the initialization value ($c_{init}$) determined based on the ASID;
- estimating, based on the positioning reference signals, signal characteristics relating to a position of the user equipment; and
- sending, to the network node, a report about the estimated signal characteristics.

7. The user equipment according to claim 6, wherein the cell identity comprises one of a physical cell identity and an extended cell identity.

8. The user equipment according to claim 6, wherein the user equipment is configured for receiving, from the network node, a request for capabilities, and for sending, to the network node, a response relating to capabilities, wherein the response includes a first indication regarding support for positioning reference signals based on the identifier.

9. The user equipment according to claim 8, wherein the cell identity comprises an extended cell identity and wherein the response includes a second indication regarding support for positioning reference signals based on the extended cell identity.

10. The method of claim 1, wherein the ASID is received according to a protocol based on Long Term Evolution (LTE) Positioning Protocol (LPP) or LTE Positioning Protocol Annex (LPPa), wherein the LPP or LPPa protocol is extended by introducing an element that contains the ASID.

* * * * *